March 8, 1960
A. DÖRR
2,927,518
PHOTOGRAPHIC CAMERA
Filed July 17, 1957
5 Sheets-Sheet 1
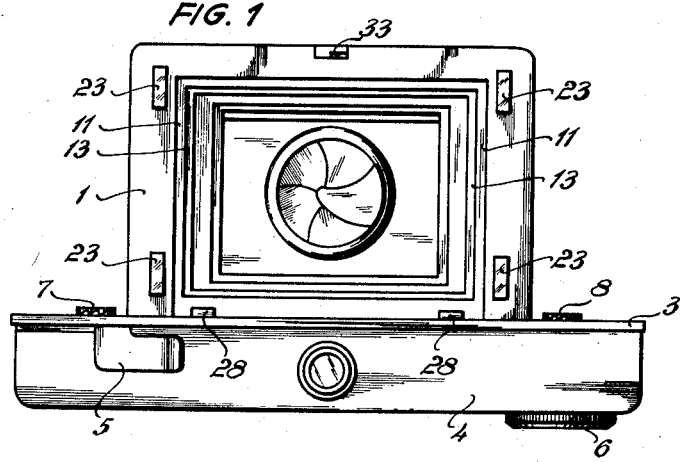
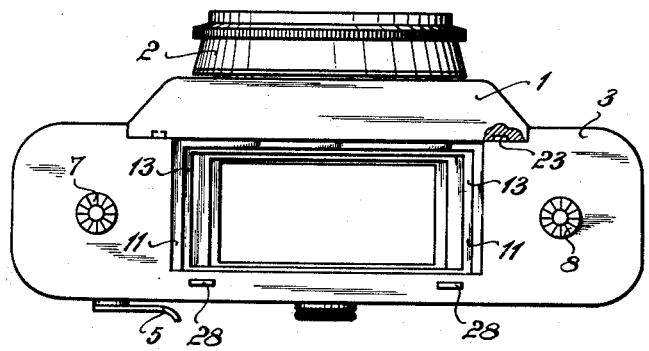
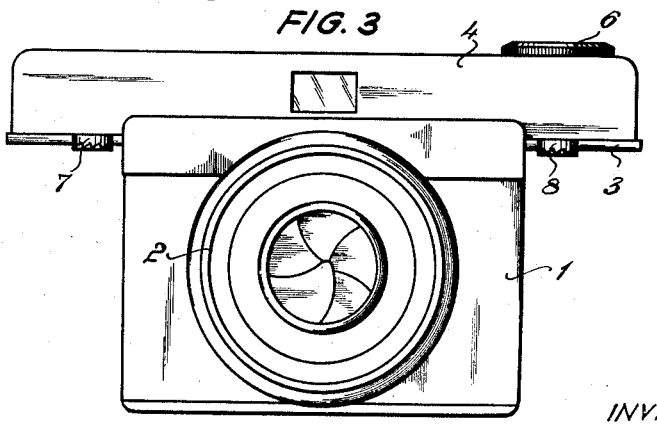
INVENTOR
ARNOLD DÖRR
BY *Mocker Blum*
ATTORNEYS March 8, 1960 A. DÖRR 2,927,518
PHOTOGRAPHIC CAMERA
Filed July 17, 1957 5 Sheets-Sheet 2

INVENTOR
ARNOLD DÖRR
BY
ATTORNEYS

March 8, 1960  A. DÖRR  2,927,518
PHOTOGRAPHIC CAMERA
Filed July 17, 1957  5 Sheets-Sheet 3
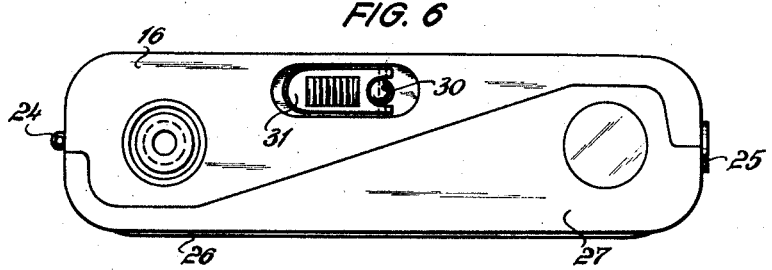
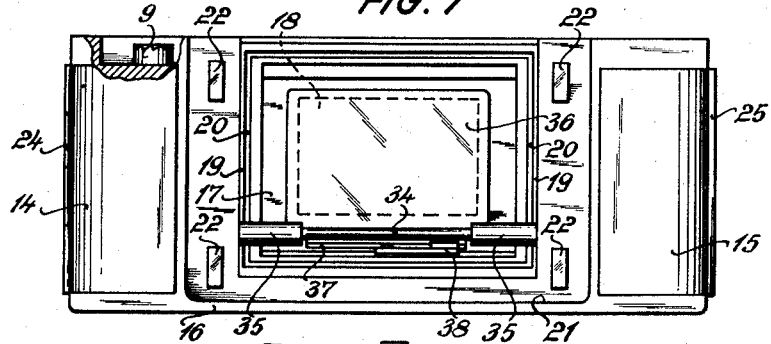
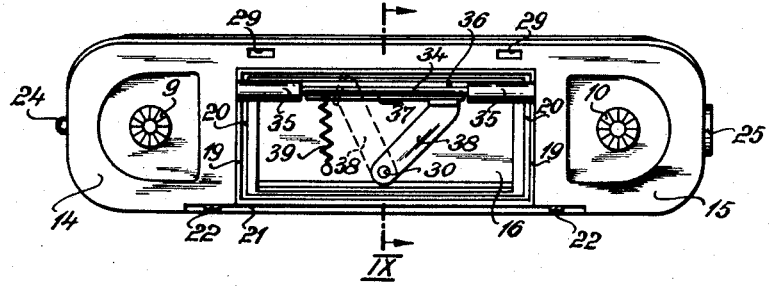
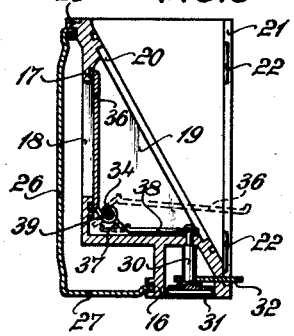
INVENTOR
ARNOLD DÖRR

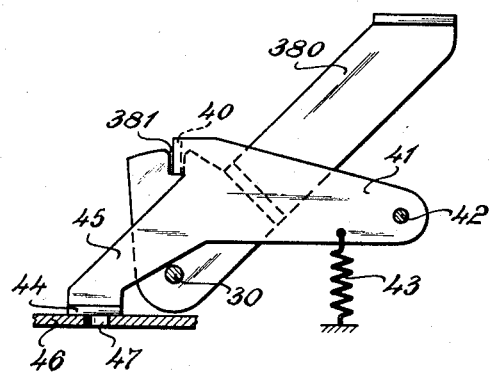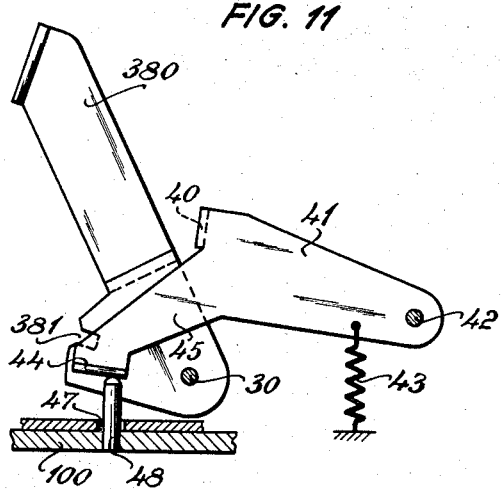

March 8, 1960

A. DÖRR 2,927,518

PHOTOGRAPHIC CAMERA

Filed July 17, 1957

INVENTOR
ARNOLD DÖRR

BY
ATTORNEYS

2,927,518

PHOTOGRAPHIC CAMERA

Arnold Dörr, Braunschweig, Germany, assignor to Voigtlander A.G., Braunschweig, Germany, a corporation of Germany Application July 17, 1957, Serial No. 672,450

Claims priority, application Germany July 21, 1956

6 Claims. (Cl. 95—31)

This invention relates to photographic cameras provided with changing magazines and it has particular relation to photographic cameras in which to a casing containing the picture-taking objective, the shutter, the view finder and the film winding device, casings for the film track, i.e. changing magazines can be attached. The latter contain the chambers for the film spools, the film feed path provided with an image window and a cover for covering and exposing, respectively, said image window. In certain conventional cameras means are provided for automatically opening said cover for the image window, when the film track casing is connected with the casing containing the picture taking objective and automatically close said cover when these two casings are separated from each other. Thus, it is possible to separate the changing magazine at any time without damage to the films, from the other camera part and to obtain the camera in ready for picture taking condition by the attachment of another changing magazine. Thereby, one of said changing magazines may contain a black and white film and the other a color film. Counting mechanisms for pictures are also built in changing magazines. Furthermore, the means for coupling the film spools arranged in the changing magazines with the film winding mechanism located in the other camera part are constructed in such a manner that they will be automatically connected upon assembling the two camera parts and are released from each other upon separation of the camera parts. Thus, no damage to the film and no losses occur upon changing the magazines.

In conventional cameras of this type the separating lines between the changing magazine and the camera part containing the objective etc., extend right-angled and parallel relative to the axes of the film spools. In order to provide for a strong connection between the two camera parts and to safely obtain a light-tight sealing between the same, one of the camera parts is provided with guide grooves adapted to be engaged by guide ledges provided on the other camera part. Thus, upon assembling the two camera parts the ledges and grooves must be slid one within another. Depending on their course, the two camera parts are then slid one within another.

It has been known to use box-shaped changing magazines which are adapted to be attached to a casing which contains the objective etc. and is likewise of box-shaped design so that in ready for picture taking condition the camera is a box-like device. It has also been suggested to shape the changing magazine and the casing containing the objective etc., in such a manner that in assembled condition these parts have the shape of a conventional, flat tube-camera. In the free space of the changing magazine between the two spool chambers, a block-shaped part can be then inserted, to which the picture taking objective is fastened. The film winding device, the view finder etc., are housed in a cap connected with said block-shaped part which lies against the upper side of the changing magazine when said camera part is connected with the changing magazine. In such a case the total camera is composed of three casing parts, i.e. the changing magazine, the block-shaped part containing the objective and the shutter and the cover cap, which is connected with said last mentioned part, and houses the film winding mechanism and the view finder, etc.

According to the present invention a photographic camera is used which has a changing magazine, and a camera part containing the picture taking objective and the shutter, said magazine being attachable to said camera part in such a manner that the camera part enters a free space between the spool chambers of the changing magazine, whereby said camera part is connected with a cap containing the film winding mechanism, the view finder etc., and said cap lies against the top side of the changing magazine. According to the present invention it is contemplated that in such a camera the walls of the light shaft for the picture taking rays are formed in part by wall portions fixedly connected with the changing magazine and in part by wall portions of the camera part containing the picture taking objective and the shutter. It has been found to be of advantage if each of the parts to be connected, i.e. the camera part on the one hand and the changing magazine on the other hand, form an undivided lower or upper wall as well as a component part of the two side walls of the light shaft. The advantage of such a sub-division of the side walls forming the light shaft, consists primarily in that the wall portions which are provided by the camera part containing the picture taking objective, can form connecting and reinforcing means between this camera part and the camera cap applied thereto. The other parts of the light shaft side walls provided in the changing magazine, form means for stiffening the changing magazine. Thus, the camera part containing the objective and the changing magazine are, when separated, stable elements free from warping.

The sub-division of the light shaft side walls is preferably carried out in such a manner that in attached condition of the changing magazine said parts of the light shaft side walls lie against each other with their front faces. The separating lines of the two light shaft side walls can extend in any desired shape, for example in a curved line. However, it is of advantage if said lines extend rectilinearly, parallel to each other, and in an angle to the axis of the film spool. The separating lines may also have a straight-lined middle portion while the end portions on both sides extend step-like. The faces of the two light shaft side walls, which lie one upon the other, are provided with light-sealing means, for example strips of felt or rubber. It has been found to be of advantage to provide in the face of one side wall portion of the light shaft a groove which is entered by a web provided on the face of the other side wall portion and thereby exerts a light-sealing effect. In order to obtain a firm connection between the changing magazine and the camera part, on the camera part flaps may be provided which engage corresponding recesses provided on the changing magazine. Furthermore, on the bottom of the changing magazine a bar or bolt, particularly a rotary bolt, can be arranged which engages the camera part carrying the objective.

In order to prevent damage by incidence of light to the film housed in the changing magazine, during separation of said magazine from the camera part, a protective flap is provided on the changing magazine for covering and exposing, respectively, the image window. Said flap is connected with the locking device between the changing magazine and the camera in such a manner that the protective flap will occupy a position in which the image window is exposed upon a locking movement of the rotary bolt and is brought to a position in which the image window is covered, upon an unlocking movement of the rotary bolt.

According to a further embodiment of the invention a locking device is provided for preventing actuation of the rotary bolt when the changing magazine is separated from the camera part carrying the objective. Thus, the protective flap covering the picture window cannot be opened when the changing magazine is separated from the camera part.

By a further locking device it can be attained that the changing magazine will be separable from the camera part only in a specific position of the film winding mechanism. It is preferred to select for the latter the position, in which transport of the film is carried out and the shutter coupled with it is set.

By this construction according to the invention of the changing magazine on the one hand and the camera part adapted to be connected therewith, on the other hand, the external appearance of the assembled camera is determined: the walls of the changing magazine form the front surface, the side surface, back surface, and the bottom surface of the camera body, while the camera part connected with the changing magazine presents in its exterior appearance only the objective board and the covering cap which forms the upper side of the camera body.

The covering cap and the objective board of photographic cameras usually consist of bright metallic materials, while the front, side and back surface and often also the bottom surface of the camera body are covered with leather. This leather covering is mostly of black color, but other colors have also been used.

Thus, in photographic cameras provided with changing magazines according to the present invention, those surfaces which are usually covered with leather, belong exclusively to the body of the changing magazine.

The use of changing magazines enables the photographer to use in one changing magazine color film and in another changing magazine a black and white film and to take colored pictures as well as black and white pictures in any desired sequence by alternately connecting the respective changing magazines with the camera part carrying the objective.

In order to facilitate to the photographer quick selection of a magazine containing a film of the desired character, according to a further embodiment of the invention in the same camera equal magazines in which the front wall, the lateral walls, the back wall and also the bottom wall of each changing magazine have different colors, are provided, for example with any desired, but different, coloration of the leather coating.

It is preferred to use black magazines and colored magazines, the colored magazines for color films and the black magazines for black and white films. Thus, the user of a camera having two separate parts of suitable design and technical construction—which form a part of the present invention—is enabled to apply the proper changing magazine which indicates by its color, or the like, the type of the film present therein.

The appended drawings illustrate by way of example some specific embodiments of and best modes for carrying out the invention to which the invention is not limited.

In the drawings

Fig. 1 illustrates the camera part carrying the picture taking objective and shutter and the camera cap, in back view;

Fig. 2 is a top view of the part shown in Fig. 1;

Fig. 3 is a front view of the part shown in Fig. 1;

Figs. 6 to 9 illustrate a changing magazine,

Fig. 6 being a view of the outer bottom surface,

Fig. 7 a front view,

Fig. 8 a top view, and

Figure 12:
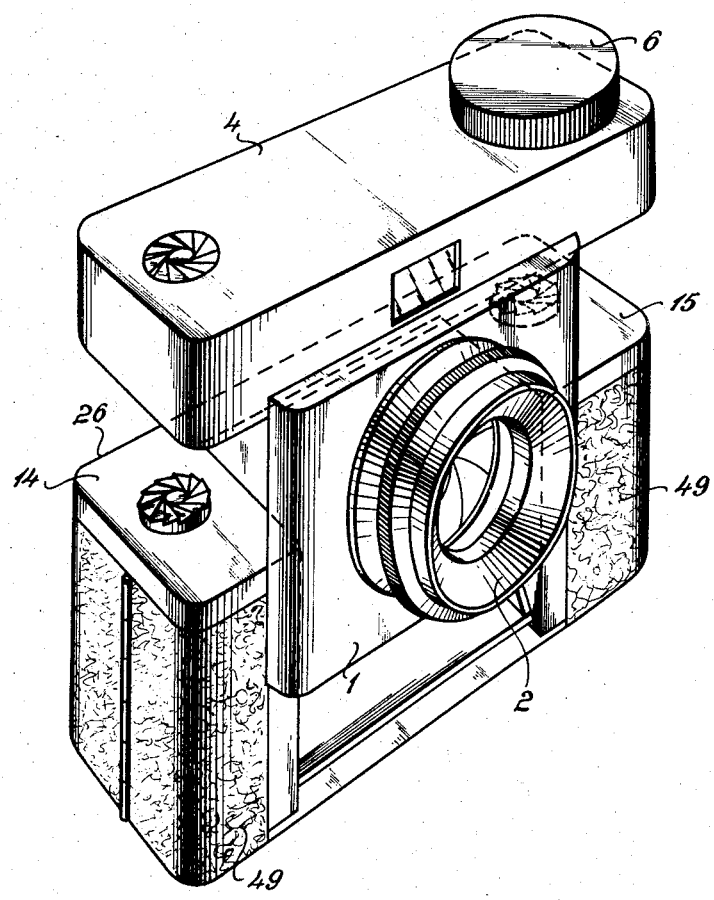

Fig. 9 a side view in section along line A—B in Fig. 8;

Figs 10 and 11 illustrate in top view the parts which lock and release, respectively, actuation of the locking device for the changing magazine and the camera part, whereby Fig. 10 shows the locking position, and Fig. 11 the release position;

Fig. 12 is the perspective view of a camera embodying the present invention.

In Figures 1–5, reference numeral 1 denotes an objective board, to which an objective provided with shutter 2 is fastened. Mounted on a plate 3, which is fixedly connected with objective board 1 and is arranged in a right angle thereto, are a film-winding and locking mechanism and a view-finder. These parts are overlapped by a camera cap 4. The film advancing lever projecting from said cap is denoted 5 and the button for winding back the film is denoted 6. Axle stumps 7 and 8 project from plate 3. They are provided with radial serrations which engage radial serrations of the same kind, provided on film spool axes 9 and 10, arranged in the changing magazine (see Figs. 7 and 8), when the changing magazine is connected with the camera part carrying the objective. In this manner a driving connection between the film winding mechanism and the film spools is established.

In order to stiffen the connection between objective board 1 and plate 3, supporting walls 11 are arranged between these two parts. Their frontal edges 12 (see Figs. 4 and 5) extend rectilinearly in an angle to the film spool axis. Light-sealing grooves 13 (see Figs. 1 and 2) are provided in the faces of these front edges 12.

The changing magazine illustrated in Fig. 4 and Figs. 6–9 can be attached to the camera part described above. The two film spool chambers 14 and 15 of the magazine (see Figs. 7 and 8) are connected with each other by a bottom plate 16 and a transverse wall 17, which latterf forms, at the same time, the film guide path. An image window 18 is provided in said transverse wall 17.

The free space between the spool chambers 14 and 15 of the changing magazine, can be entered by the supporting walls 11 of the objective-carrying camera part when the latter is connected with said magazine. On the walls (which laterally limit the free space of the changing magazine) of the spool chambers 14 and 15, supporting walls 19 extend, the faces of which carry webs 20 which enter the light-sealing grooves 13 of supporting walls 11 (see Figs. 1 and 2). The spporting walls 19 act as stiffening means for the changing magazine. The light-sealing grooves 13 and the webs 20 extend not only in the faces of the supporting walls 11 and 19, respectively, but (as can be seen in Figs. 1 and 7) also in the walls of the camera part and of the changing magazine, which connect these supporting walls with each other so that—when the camera part and the changing magazine are connected with each other—the light shaft formed by them for the picture taking rays, is tightly sealed from light. The two side walls of this light shaft are formed by supporting walls 11 and 19 of the camera part and changing magazine, respectively, said supporting walls lying against each other with their faces. The plate 3 of the camera part is the upper wall and the bottom plate 16 of the changing magazine is the lower wall of this light shaft.

Objective board 1 is wider and higher than the free space between the spool chambers 14 and 15 of the changing magazine. Therefore, on the front side of the changing magazine a recess 21 (see Figs. 7–9) which corresponds to the size of the objective board, is provided. In the range of recess 21 contact surfaces 22 are arranged, against which the objective board 1 lies with countersurfaces 23 (see Figs. 1 and 2) when the camera part is connected with the changing magazine. The surfaces 22 and 23 determine the distance between the objective and the image plane.

The changing magazine is provided with a back wall 26, which can be hinged down about a hinge 24 and locked in its closed position. In order to facilitate the insertion and removal of the film cartridge, the back wall 26 has a bent portion 27 which forms part of the bottom of the changing magazine. Therefore, in open position the back wall 26 exposes not only the back side of the magazine, but also the bottom surface of the magazine which lies below the spool chamber 15. In this manner the film cartridge can be removed from the changing magazine in the direction of the spool axis.

Figure 4:
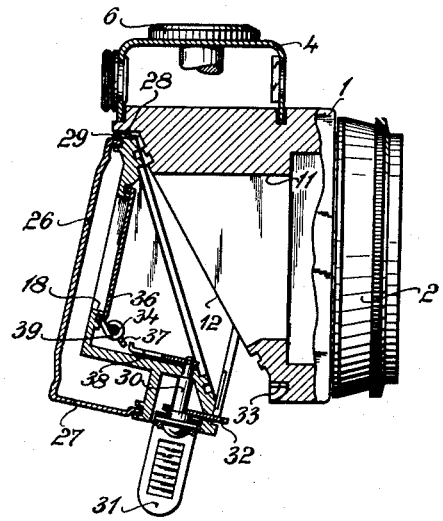
Fig. 4 illustrates in side view, partially in middle section, the camera part shown in Fig. 1, together with a changing magazine which is in an intermediate position during the attachment step.
Figure 5:
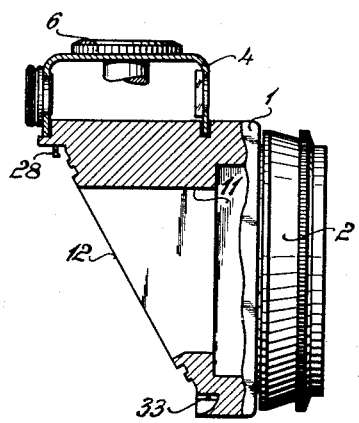
Fig. 5 is a side view, partially in middle section, of the camera part shown in Fig. 1.

In order to obtain a firm connection of the changing magazine with the camera part, the plate 3 of the camera part is provided with two flaps 28 (see Figs. 1, 4 and 5). The changing magazine has two apertures 29 (see Figs. 4, 8 and 9), in which—as shown in Fig. 4—the flaps 28 are inserted at the start of the attaching step. The camera part and the changing magazine are then swung together until the objective board is seated in the recess 21. Supporting walls 11 which are located on the camera part and supporting walls 19 which are located on the changing magazine, are thereby assembled along their faces, whereby a light-sealing effect results. A locking device is arranged on bottom plate 16 of the changing magazine. A handle member 31 is tiltably fastened to a rotatable shaft 30. Fig. 4 shows said handle member 31 in swung down position, in which it can be grasped and turned, whereby the shaft 30 is likewise turned. To said shaft a hook-shaped rotary bolt 32 is fastened. In the camera part a slot 33 is provided for rotary bolt 32. When the camera part and the changing magazine are swung together, rotary bolt 32 enters slot 33. By turning shaft 30 by means of handle member 31, the rotary bolt 32 becomes arrested in slot 33 so that the camera part and the changing magazine will be firmly connected with each other. In bottom plate 16 of the changing magazine a cavity is provided (see Fig. 6) the form of which is adapted to the form of handle member 31. After locking, member 31 can be swung into said cavity so that—as shown in Fig. 9—it will not project beyond the surface of bottom plate 16. In this manner the locking is protected from accidental and inadvertent release. In order to permit movement of rotary bolt 32 (see Fig. 4), member 31 must be swung out again.

If the changing magazine is supposed to be separated from the camera part, its image window 18 must be sealable from light in order to avoid damage to the film present in the magazine. In order to attain this, in the changing magazine, below the image window side extending along bottom plate 16, a shaft 34 is arranged in two bearings 35 and to the shaft a protective flap 36 for covering the image window is fastened. The protective flap has a lobe 37 which extends in the direction of bottom plate 16. Said lobe can be engaged by a tiltable arm 38 which is firmly connected with shaft 30 of the locking device between the magazine and the camera part. Lobe 37 is engaged by a draw spring 39, the other end of which is fixedly connected to the bottom plate 16. The draw spring 39 urges the protective flap 36 constantly to a position in which it covers the image window 18. Tiltable arm 38 on shaft 30 and lobe 37 on flap 36 co-act in such a manner that—when camera part and changing magazine are locked with each other—tiltable arm 38 exerts pressure on lobe 37 so that protective flap 36 is held—against the effect of spring 39—in a position in which the image window 18 is exposed. In Figs. 8 and 9 this position of protective flap 36 and tiltable arm 38, is shown in dotted lines.

When the locking device is moved to the unlocking position in order to separate the changing magazine from the camera part, i.e. when, by turning shaft 30, the rotary bolt 32 is caused to emerge from slot 33, the tiltable arm 38 is also tilted at the same time. It admits then displacement of protective flap 36 by the action of draw spring 39 from the open position to the position in which it covers the image window and seals it from light.

Upon attachment of the changing magazine to the camera part, the protective flap 36 is removed from its light-sealing position to the exposing position, relative to the image window 18 only when the changing magazine and the camera part are locked together after being assembled.

A locking device is provided in order to prevent opening of protective flap 36 by actuation of the bolting device arranged in the changing magazine, when the changing magazine is separated from the camera part. This locking device prevents actuation of the bolting device when the film-changing magazine is separated from the camera part.

Figures 10 and 11 show a tiltable lever 380, which has a somewhat different design than that of tilting lever 38, but the same functions and objects as lever 38. Figure 10 illustrates this lever 380 in a position which corresponds to the position of lever 38 shown in full line in Fig. 8. The position of lever 380 shown in Fig. 11, corresponds to the position of lever 38 shown in dotted lines in Fig. 8. As shown in Figs. 10 and 11, a notch 381 is provided in tiltable lever 380, which is fastened to shaft 30. This notch 381 can be engaged by a flap 40 of a locking lever 41. The latter is arranged tiltably about bolt 42, which—like shaft 30—is seated in bottom plate 16 of the film-changing magazine. A draw spring 43 holds an arm 45 provided with bent portion 44, of locking lever 41 in engagement with a wall 46 of the changing magazine, an opening 47 being provided in said wall 46. Fig. 10 illustrates position of the parts when the changing magazine is separated from the camera part. Thereby, flap 40 of locking lever 41 engages notch 381 of lever 380 and thereby prevents the latter from being moved. Therefore, it cannot be moved to a position for opening protective flap 36.

When the film-changing magazine is assembled with the camera part, a pin 48 provided on the camera part 100, will pass through opening 47, as shown in Fig. 11. This pin 48 will thereby come in contact with bent portion 44 of locking lever 41 and cause tilting of the latter against the effect of draw spring 43 in such a manner that flap 40 will emerge from notch 381 of lever 380. The latter can then be moved, i.e. the locking of the bolting device between changing magazine and camera part is released.

Figure 12 illustrates the above described camera provided with a film-changing magazine in unassembled condition, in perspective view. In this figure, the changing magazine and the camera part comprising the objective board 1, shutter 2 and cap 4 (which overlaps the film transport mechanism) can be seen.

The exterior walls of the changing magazine which enclose the spool chambers 14 and 15, as well as the outer side of back wall 26 and the bottom surface of the changing magazine which is composed of the parts 16 and 27 (see Figs. 6 and 9) and cannot be seen in Fig. 12, are provided with a coating or cover 49 of leather or synthetic plastic material in a manner customary in conventional complete cameras.

While in conventional complete cameras this cover or coating mostly consists of black colored material, this cover 49 should be black in some changing magazines embodying the present invention and of a different color in others. The changing magazines having colored outer covers are contemplated for the use of color film and magazines provided with a black outer cover 49 are contemplated for black-and-white films. Thus, the color of the changing magazine indicates the type of film inserted therein.

Objective board 1 and camera cap 4 shown in Fig. 12 consist of bright metallic material and only the exterior surfaces of the changing magazine are provided with a black or colored cover or coating 49.

It will be understood from the above that this invention is not limited to the parts, constructions, designs, arrangements and other details specifically described above and illustrated in the drawings and can be carried out with various modifications without departing from the scope of the invention as defined in the appended claims.

What is claimed is:

1. A photographic camera comprising a camera body and a changing magazine for film spools; the camera body including an objective board, a picture taking objective provided with a shutter and fastened to the objective board, a plate arranged perpendicularly relative to the objective board, supporting walls extending between the objective board and said plate in such a manner that the two oppositely located free lateral edges of the objective board are connected with lateral walls which are perpendicular to the plane of the objective board, extend over the full width of said plate, whereby the free front edges of said lateral walls extend parallel with each other and substantially rectilinearly from the objective board, to the edge of the objective board, turned away from said plate; a camera cap arranged on said plate, and, housed by said cap, a view-finder, a film-winding and locking mechanism, and members projecting from the camera cap, for coupling the mechanism with the film spools in the changing magazine; the changing magazine comprising two film spool chambers, a bottom plate and a transverse wall perpendicular thereto, said wall connecting said chambers and forming a film guide path; an image window provided in said wall and a covering flap arranged in front of said window; a film spool axis projecting from each of the film chambers, for being connected with the coupling members, when the changing magazine is connected with the camera body; a light shaft for the picture taking rays, the walls of which are provided in part by wall portions forming part of the changing magazine and in part by wall portions forming part of the camera body, whereby a side wall of said shaft is formed by said plate of the camera body, and the opposite side wall is formed by said bottom plate of the changing magazine; the two other oppositely arranged side walls of the light shaft, being formed in part by walls of the spool chambers and in part by said supporting walls of the camera body; the remaining walls of the light shaft being formed by the inner surfaces of the objective board and the transverse wall forming the film guide path.

2. A photographic camera as claimed in claim 1, in which the cap is provided with flaps and the changing magazine is provided with apertures adapted to be engaged by said flaps and the changing magazine comprises a rotary bolt arranged on the bottom of the changing magazine and adapted to engage the camera part.

3. A photographic camera as claimed in claim 2, in which the changing magazine comprises a protective flap for alternately covering and exposing an image window provided in the magazine and a locking device arranged between the changing magazine and the camera part; said protective flap being connected with the locking device in such a manner that, upon bolting movement of the rotary bolt, the protective flap can be put in a position in which it exposes the image window and, upon unbolting movement of the rotary bolt, the protective flap can be put in a position in which it seals the image window; the changing magazine comprises a shaft for the rotary bolt and also comprises a tiltable arm fastened to said shaft; the protective flap being provided with a lobe; said tiltable arm lying against said lobe in unbolting position of the rotary bolt in order to keep the protective flap in a position in which it seals the image window.

4. A photographic camera as claimed in claim 3, comprising a tiltable lever which is fastened to the shaft of the rotary bolt and is provided with a notch; a locking lever which is tiltably arranged under spring effect and adapted to engage said notch in unbolting position of the rotary bolt, whereby the rotary bolt is prevented from moving.

5. A photographic camera as claimed in claim 4, comprising a pin fastened to the camera part, causing, in assembled condition of the camera part with the changing magazine, tilting of the locking lever against the effect of the spring to a position in which it is out of engagement with a tiltable arm of the rotary bolt in order to permit free movement of the rotary bolt.

6. A photographic camera as claimed in claim 1, in which the exposed elements of the camera parts have metallic surfaces, while the exposed parts of the changing magazine have a color for indicating the type of film inserted in the changing magazine.

References Cited in the file of this patent

UNITED STATES PATENTS

| | | |
|---|---|---|
| 1,865,272 | Owens | June 28, 1932 |
| 2,172,337 | Mihalyi | Sept. 5, 1939 |
| 2,257,424 | Meyer | Sept. 30, 1941 |

FOREIGN PATENTS

| | | |
|---|---|---|
| 834,548 | France | Oct. 22, 1938 |
| 99,364 | Sweden | July 9, 1940 |
| 889,261 | France | Sept. 17, 1943 |
| 900,980 | France | Oct. 23, 1944 |
| 933,275 | France | Dec. 17, 1947 |